(12) United States Patent
Anaykumar et al.

(10) Patent No.: US 11,349,418 B2
(45) Date of Patent: May 31, 2022

(54) METHOD AND SYSTEM FOR CRANKING AN INTERNAL COMBUSTION ENGINE

(71) Applicant: SEDEMAC MECHATRONICS PVT LTD, Mumbai (IN)

(72) Inventors: Joshi Anaykumar, Nagpur (IN); Dixit Amit, Thane W (IN)

(73) Assignee: SEDEMAC MECHATRONICS PVT LTD, Mumbai (IN)

( * ) Notice: Subject to any disclaimer, the term of this patent is extended or adjusted under 35 U.S.C. 154(b) by 903 days.

(21) Appl. No.: 16/077,156

(22) PCT Filed: Feb. 13, 2017

(86) PCT No.: PCT/IN2017/000036
§ 371 (c)(1),
(2) Date: Aug. 10, 2018

(87) PCT Pub. No.: WO2017/138020
PCT Pub. Date: Aug. 17, 2017

(65) Prior Publication Data
US 2021/0211077 A1 Jul. 8, 2021

(30) Foreign Application Priority Data

Feb. 11, 2016 (IN) .............................. 201621004628
Nov. 23, 2016 (IN) .............................. 201621040030

(51) Int. Cl.
H02P 6/00 (2016.01)
H02P 6/20 (2016.01)
(Continued)

(52) U.S. Cl.
CPC ................ *H02P 6/20* (2013.01); *F02N 11/08* (2013.01); *H02P 6/185* (2013.01);
(Continued)

(58) Field of Classification Search
CPC .. H02P 6/20; H02P 6/185; F02N 11/08; F02N 2200/022; F02N 2200/063; F02N 2200/044; F02P 2207/05
See application file for complete search history.

(56) References Cited

U.S. PATENT DOCUMENTS 4,364,004 A * 12/1982 Bourbeau ............... H02P 25/03
318/721
5,468,188 A * 11/1995 Day ........................ F16D 3/725
464/60

(Continued)

OTHER PUBLICATIONS

United State Patent and Trademark Office (ISR/US), "International Search Report for PCT/IN2017/000036", US, dated Sep. 26, 2017.

*Primary Examiner* — Phutthiwat Wongwian
*Assistant Examiner* — Sherman D Manley
(74) *Attorney, Agent, or Firm* — Locke Lord LLP; Tim Tingkang Xia, Esq.

(57) ABSTRACT

The invention relates to a method for cranking an internal combustion engine, including the steps of: (a) receiving a start signal; (b) determining an initial position of the rotor with respect to a stator phase winding; (c) applying a pulse-width-modulated signal to the stator winding corresponding to determined initial position of the rotor; (d) determining a threshold value of the stator current variation; (e) measuring current of the stator winding in response to applied pulse-width-modulated signal to determine current variation; (f) if current variation is more than the threshold value, determining updated rotor position, applying a pulse-width-modulated signal to the stator winding corresponding to the updated rotor position; and repeating steps (d)-(f); and (g) if current variation is less than the threshold value, applying a pulse-width-modulated signal to the stator winding corresponding to the last updated rotor position and repeating steps (d)-(g).

4 Claims, 5 Drawing Sheets

(51) Int. Cl.
*F02N 11/08* (2006.01)
*H02P 6/185* (2016.01)

(52) U.S. Cl.
CPC .. *F02N 2200/022* (2013.01); *F02N 2200/044* (2013.01); *F02N 2200/063* (2013.01); *H02P 2207/05* (2013.01)

(56) References Cited

U.S. PATENT DOCUMENTS

| | | | | |
|---|---|---|---|---|
| 5,600,218 A * | 2/1997 | Rolling | | H02P 6/18 |
| | | | | 318/400.04 |
| 5,627,444 A * | 5/1997 | Fulks | | H02P 6/185 |
| | | | | 318/400.17 |
| 5,821,713 A * | 10/1998 | Rolling | | H02P 6/18 |
| | | | | 318/400.32 |
| 6,023,137 A | 2/2000 | Kumar et al. | | |
| 7,122,980 B2 * | 10/2006 | Kuroshima | | H02P 6/182 |
| | | | | 318/400.11 |
| 7,712,592 B2 * | 5/2010 | Jansen | | F16D 41/206 |
| | | | | 192/41 S |
| 8,387,767 B2 * | 3/2013 | Komorowski | | F16D 27/105 |
| | | | | 192/90 |
| 9,160,264 B2 * | 10/2015 | Hu | | H02P 6/183 |
| 9,638,270 B2 * | 5/2017 | Antchak | | F16D 43/24 |
| 9,651,099 B2 * | 5/2017 | Antchak | | F16H 55/36 |
| 9,689,486 B2 * | 6/2017 | Williams | | F16D 41/206 |
| 9,869,365 B2 * | 1/2018 | Tran | | F02N 11/04 |
| RE47,406 E * | 5/2019 | Antchak | | F16D 41/206 |
| 10,767,724 B2 * | 9/2020 | Tran | | F16F 15/12346 |
| 2004/0014540 A1 * | 1/2004 | Dell | | F16H 55/36 |
| | | | | 474/70 |
| 2004/0104090 A1 * | 6/2004 | Jansen | | F16D 41/20 |
| | | | | 192/41 S |
| 2005/0250607 A1 * | 11/2005 | Jansen | | F02B 67/06 |
| | | | | 474/74 |
| 2006/0097688 A1 * | 5/2006 | Patel | | H02P 6/20 |
| | | | | 318/778 |
| 2010/0083461 A1 * | 4/2010 | Norell | | A47L 7/0076 |
| | | | | 15/412 |
| 2010/0181952 A1 * | 7/2010 | Cheng | | H02P 6/20 |
| | | | | 318/400.33 |
| 2011/0109255 A1 * | 5/2011 | Bonvin | | H02P 6/185 |
| | | | | 318/400.33 |
| 2013/0342145 A1 * | 12/2013 | Kobayashi | | H02P 6/185 |
| | | | | 318/400.33 |
| 2014/0049201 A1 * | 2/2014 | Hirono | | H02P 1/166 |
| | | | | 318/400.23 |
| 2014/0132199 A1 * | 5/2014 | Zanelato | | H02P 1/42 |
| | | | | 318/785 |
| 2016/0079894 A1 * | 3/2016 | Nessel | | H02P 6/16 |
| | | | | 318/400.26 |
| 2018/0175752 A1 * | 6/2018 | Takeoka | | H02M 7/53871 |
| 2018/0198391 A1 * | 7/2018 | Stichweh | | H02P 21/18 |
| 2019/0010995 A1 * | 1/2019 | Choi | | F16D 41/06 |

* cited by examiner

METHOD AND SYSTEM FOR CRANKING AN INTERNAL COMBUSTION ENGINE

FIELD OF THE INVENTION

The invention relates to cranking an internal combustion engine and more particularly to method and system for cranking an internal combustion engine coupled to a permanent magnet machine.

BACKGROUND OF THE INVENTION

An Integrated Starter Generator (ISG) system is generally used for the purpose of starting an Internal Combustion (IC) engine and for electric power generation. Typically an ISG system has a single electric machine connected to a crankshaft of a vehicle. For starting of IC engine, the electric machine is rotated which in turn rotates the crankshaft. Such rotation should be at a sufficiently high speed before the self-sustaining combustion process can commence inside the IC engine. During a power generation operation, crankshaft rotates the electric machine to generate electric power required to charge a battery and power other electrical loads of the vehicle.

In a conventional ISG system, an electronic control unit (ECU) is placed between a battery and an electric machine of a vehicle where the ECU regulates bidirectional flow of electric power between the battery and electric machine. During engine start operation, the ECU draws power from the battery and feeds it to drive the electric machine, whereas during power generation operation, it regulates flow of electric power from the electric machine to charge the battery and also supply power to other electrical loads.

Most ISG systems use a permanent magnet brushless electric machine (BLDC machine). Such machines consist of a stator made of a polyphase winding, and a rotor made of permanent magnets. For optimal operation of ISG system, the ECU needs to excite the stator windings in a particular sequence with respect to the position of the rotor of the electric machine. In this regard, multiple hall-effect based sensors are typically used for sensing rotor position. Such sensors are placed either inside the stator windings or a separate magnetic ring is used to trigger the hall-effect based sensors. In either case, the sensors are needed to be placed inside a casing of the IC engine. An alternative to hall-effect based sensors is to use an absolute angle sensor of the crankshaft. However, such sensor also needs to be placed inside the engine casing.

Since such sensors are placed inside engine casing, they are subjected to harsh operating conditions such as high temperature and vibrations, which make them prone to failure. Further, a special arrangement is required for mounting the sensors which adds cost and occupies space inside the engine casing. Furthermore, the sensors need to be connected to ECU using wires for providing signals from the sensors to the ECU. For this purpose, a provision for routing of wires from sensors to ECU is also required. Further, any damage to wires impairs operation of the ISG system.

In view of the above there exists a need in the art to at least address the above mentioned problems.

SUMMARY OF THE INVENTION

Accordingly, the present invention in one aspect provides a method for cranking an internal combustion engine coupled to a permanent magnet machine. The permanent magnet machine comprising a rotor having a plurality of permanent magnets poles, and a stator having a plurality of phase windings disposed on the stator, each phase winding including a plurality of coils. The method comprising the steps of: (a) receiving a start signal; (b) determining an initial position of the rotor with respect to a stator phase winding; (c) applying a pulse-width-modulated signal to the stator winding corresponding to determined initial position of the rotor; (d) determining a threshold value of the stator current variation; (e) measuring current of the stator winding in response to applied pulse-width-modulated signal to determine current variation; (f) if current variation is more than the threshold value: determining updated rotor position, applying a pulse-width-modulated signal to the stator winding corresponding to the updated rotor position; and repeating steps (d)-(f); and (g) if current variation is less than the threshold value: applying a pulse-width-modulated signal to the stator winding corresponding to the last updated rotor position and repeating steps (d)-(g).

In another aspect, the present invention provides a system for cranking an internal combustion engine coupled to a permanent magnet machine. The permanent magnet machine comprising a rotor having a plurality of permanent magnets poles, and a stator having a plurality of phase windings disposed on the stator, each phase winding including a plurality of coils. The system comprising: a control unit coupled to permanent magnet machine and a power supply connected to the control unit. The control unit is configured to: (a) receive a start signal; (b) determine an initial position of the rotor with respect to a stator phase winding; (c) apply a pulse-width-modulated signal to the stator winding corresponding to determined initial position of the rotor; (d) determine a threshold value of the stator current variation; (e) measure current of the stator winding in response to applied pulse-width-modulated signal to determine current variation; (f) if current variation is more than the threshold value: determine updated rotor position, apply a pulse-width-modulated signal to the stator winding corresponding to the updated rotor position; and repeat steps (d)-(f); and (g) if current variation is less than the threshold value: apply a pulse-width-modulated signal to the stator winding corresponding to the last updated rotor position and repeat steps (d)-(g).

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed to a method and a system for cranking an internal combustion engine coupled to a permanent magnet machine.

Figure 1:
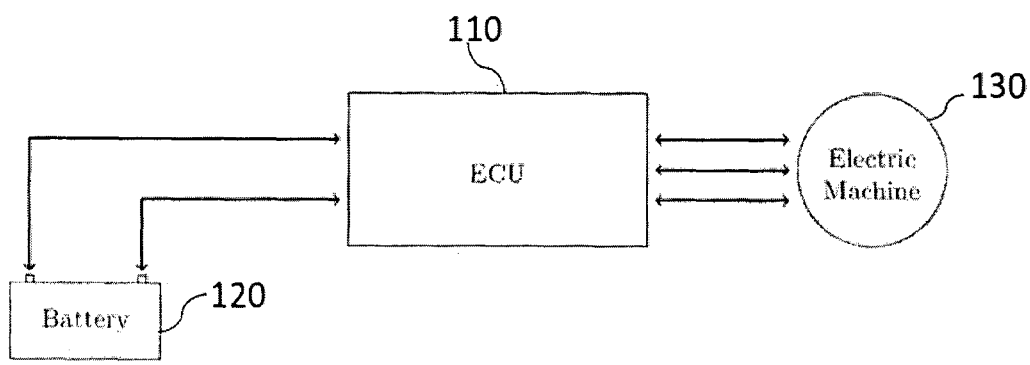
FIG. 1 illustrates a schematic view of a system for cranking an internal combustion engine in accordance with an embodiment of the invention.

FIG. 1 illustrates a schematic view of a system 100 for controlling an electric machine 130 to achieve a desired cranking of an internal combustion engine in accordance with an embodiment of the invention. The permanent magnet machine includes a rotor having a plurality of permanent magnets poles, and a stator having a plurality of phase windings disposed on the stator, each phase winding including a plurality of coils, As shown, a control unit 110 is connected to a power supply 120 and the electric motor 130. In this regard, the control unit may be a dedicated or an onboard Electronic Control Unit (ECU) of a vehicle. The power supply may be a battery of the vehicle.

Based on various inputs in the form of voltage, current, speed of the electric motor, etc, received by the ECU, the ECU determines position of the rotor and further provides requisite signal to excite the relevant stator windings based on the rotor position.

Figure 2:
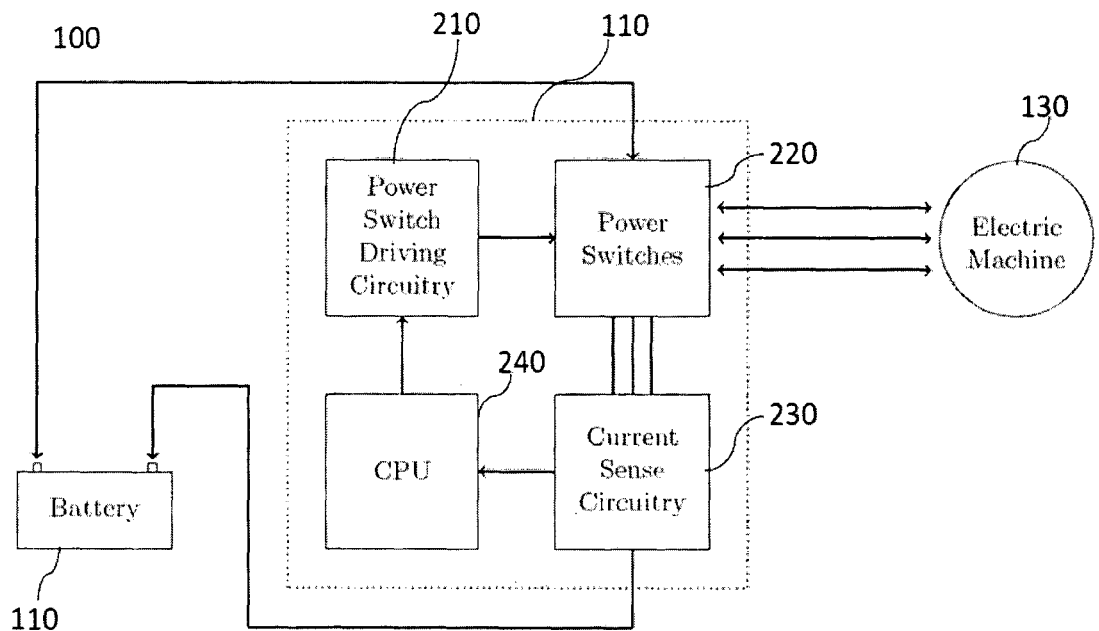
FIG. 2 illustrates architecture of a control unit in accordance with an embodiment of the invention.

FIG. 2 illustrates architecture of the control unit in accordance with an embodiment of the invention. The ECU comprises a set of power switches 220 used to selectively connect battery terminals to motor terminals. The power switches are driven by a control circuit or a power switch driving circuit 210. A current sensing circuit 230 converts the current flowing through the electric machine or through battery in a form that can be read by a central processing unit (CPU) 240.

Based on inputs received from current sensing circuit and other parameters, the CPU determines position of the rotor and sends commands to control circuit, which actuates appropriate power switches to connect selected terminals of motor to battery terminals.

Figure 3:
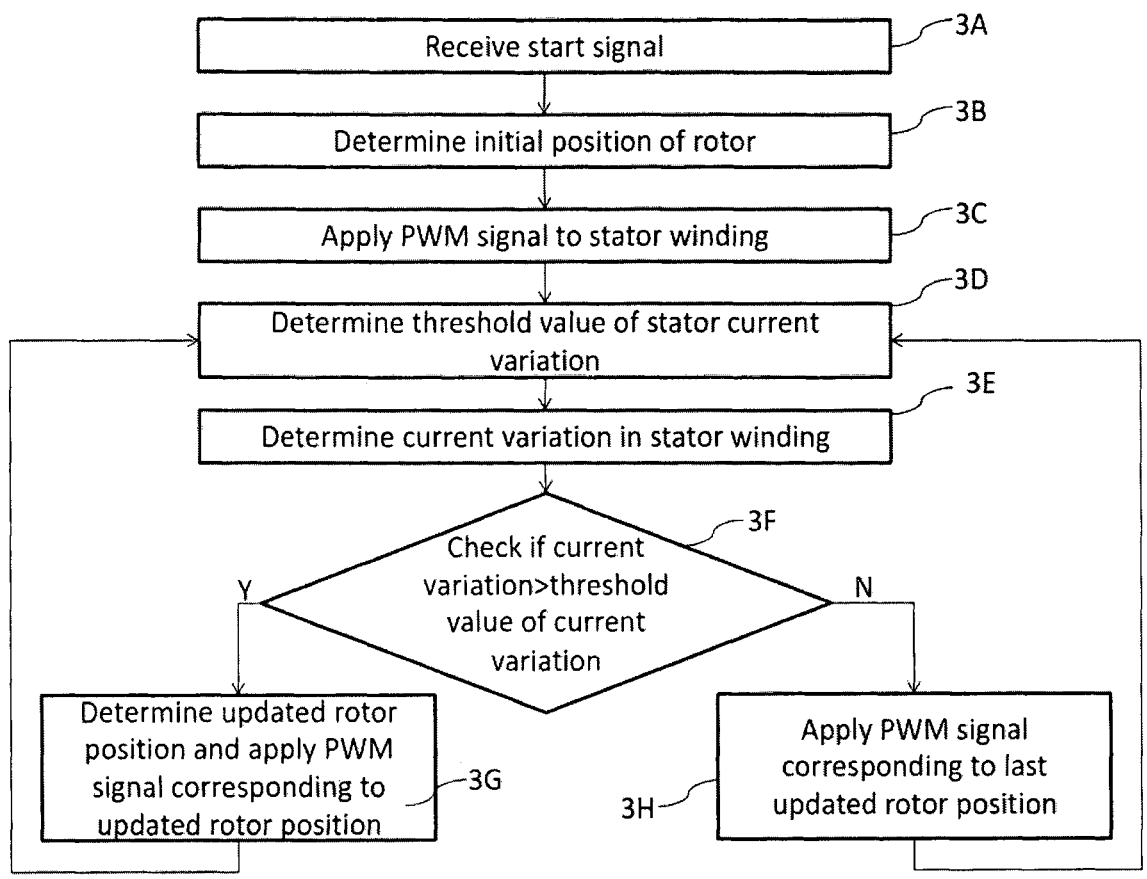
FIG. 3 shows a flowchart illustrating steps taken for cranking an internal combustion engine in accordance with an embodiment of the invention.

FIG. 3 shows a flowchart illustrating steps taken to control an integrated starter-generator in accordance with an embodiment of the invention. At step 3A, the CPU checks if a start command is received. If no start command is received, the CPU remains in step 3A. If a start command is received, in step 3B, the CPU determines an initial position of the rotor with respect to a stator phase winding.

For determination of initial position of the rotor with respect to a stator phase winding, CPU selects a pair of stator phase windings and a voltage signal is applied across the selected pair of stator phase windings for a predetermined period of time. Current measurement is carried for each of the selected windings. Initial position of the rotor is determined based on the pair of stator phase windings for which the measured current is maximum. At step 3C, the CPU applies a pulse-width-modulated (PWM) signal to the stator winding corresponding to determined initial position of the rotor.

Figure 4:
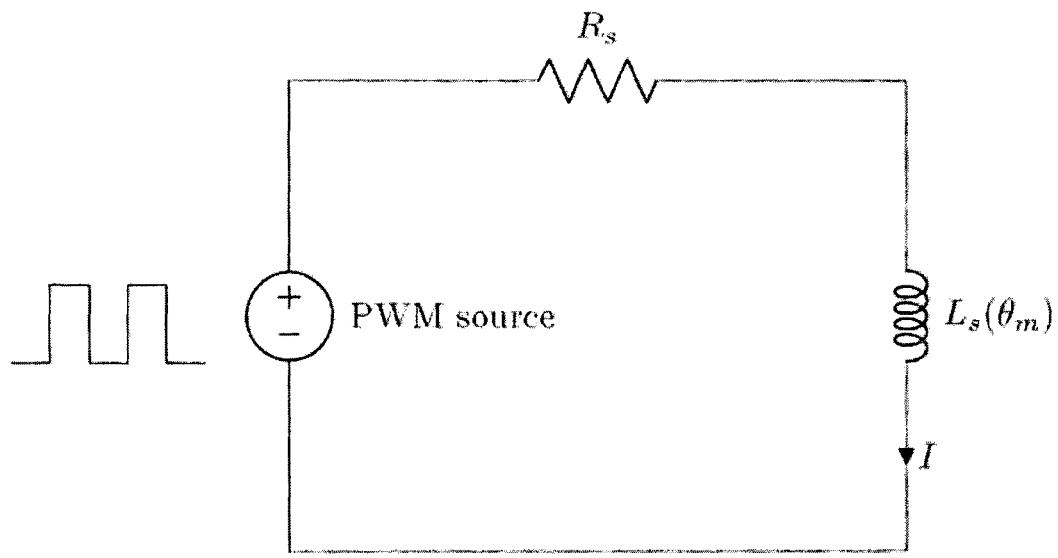
FIG. 4 shows an equivalent circuit of an electric machine as seen from active terminals of a motor.
Figure 5:
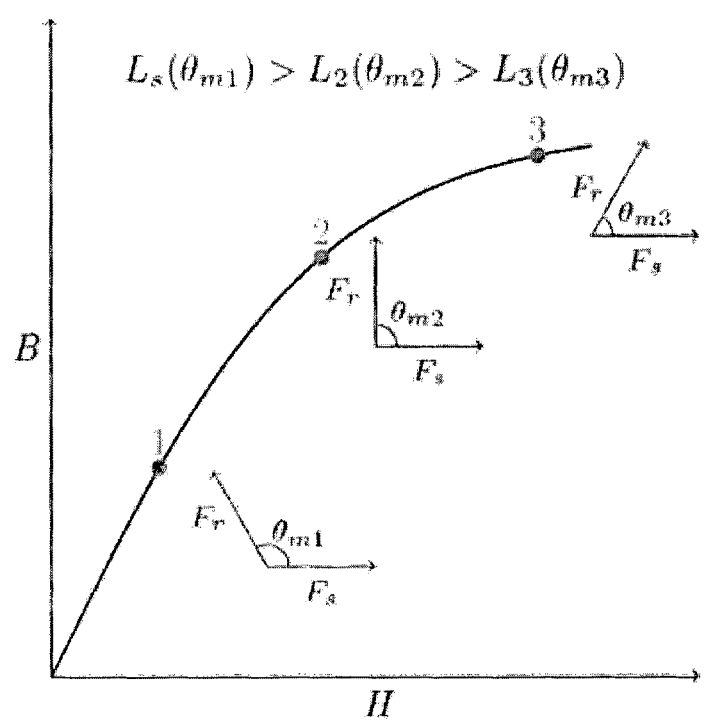
FIG. 5 shows relation between the inductance of a machine and position of the rotor.

Referring to FIG. 4 which depicts an equivalent circuit of the electric machine as seen from active motor terminals when a specific stator excitation is applied. When a specific stator excitation is applied, a magnetic field is built within the stator. For a given stator excitation with a given amount of stator current, the inductance of the machine as seen from the active motor terminals is a function of rotor position as described in FIG. 5. As the rotor magnetic field aligns with the stator excitation magnetic field, the stator material enters magnetic saturation. Since inductance is proportional to the slope of the BH curve, the inductance as seen from the active motor terminals decreases. This change in inductance as a function of rotor position and as a function of stator excitation is leveraged to detect initial rotor position and to update stator excitation as the rotor moves during motoring action.

Figure 6:
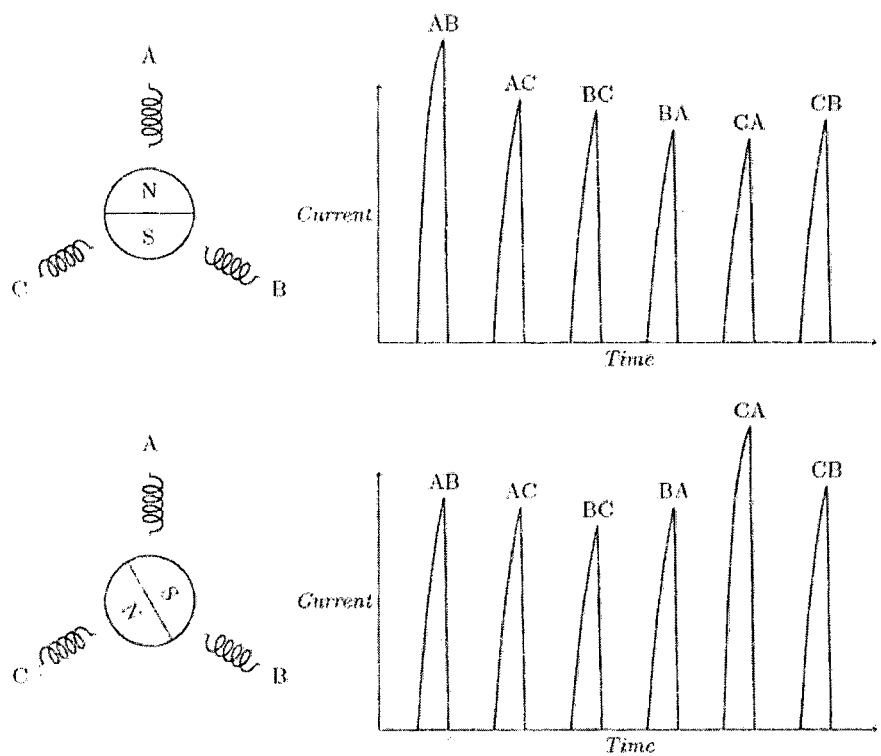
FIG. 6 is a graphical representation of results obtained while determining an initial position of a rotor in accordance with an embodiment of the invention.

FIG. 6 is a graphical representation of results obtained while determining an initial position of a rotor in accordance with an embodiment of the invention. It shows result of a typical initial position estimation procedure, which shows the current detected by current measurement circuit for a set of commands for two different rotor positions. As seen from the figure, the current detected by the current measurement circuit for all commands is not same. The current detected corresponding to one command is substantially more than others. The command corresponding to which the current is more is different for different rotor positions. Thus, by observing the command for which the detected current is maximum, it is possible to determine the rotor position.

At step 3D, the CPU determines threshold value of stator current variation. In this regard, instantaneous or average battery voltage is measured along with instantaneous or average engine speed. Thereafter, stator current is measured substantially at the beginning of PWM cycle and substantially at the end of PWM cycle. Based on these measurements, the threshold value is determined.

At step 3E, the CPU measures current of the stator winding in response to applied PWM signal to determine current variation. At step 3F, current variation is compared with the threshold value determined in step 3D. In case the current variation is more than the threshold value, updated rotor position is determined at step 3G and a PWM signal is applied to the stator winding corresponding to the updated rotor position. In case the current variation is less than the threshold value, PWM signal is applied, at step 3H, to the stator winding corresponding to the last updated position of the rotor and current of the stator winding in response to applied PWM signal is measured to determine current variation.

Figure 7:
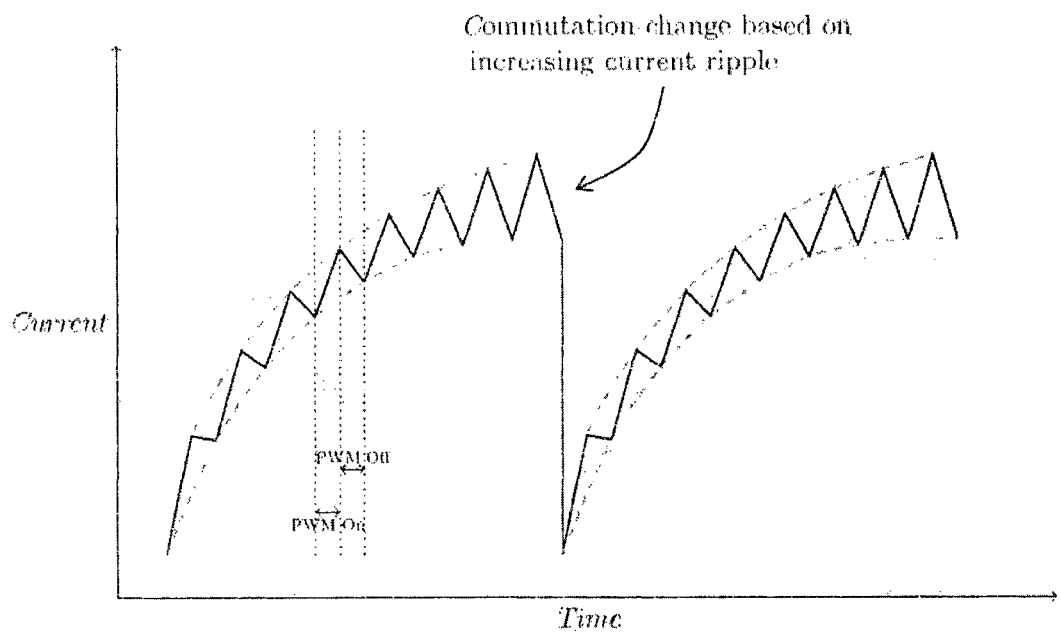
FIG. 7 is a graphical representation current variation and commutation based on current variation in accordance with an embodiment of the invention.
Figure 8:
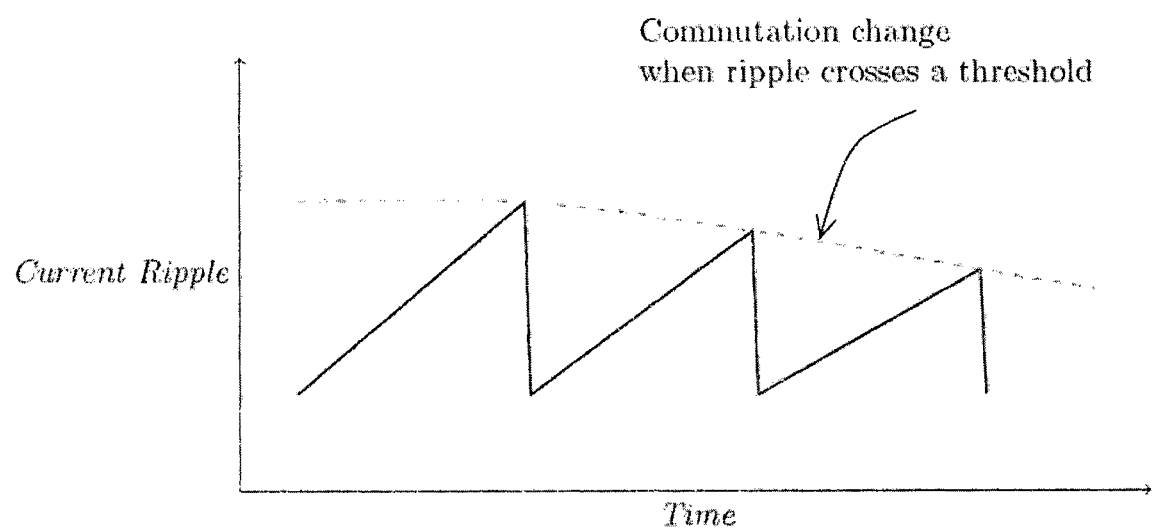
FIG. 8 shows a relation between current ripple and time to determine the change in commutation.

FIG. 7 is a graphical representation of current variation and commutation based on current variation in accordance with an embodiment of the invention. A PWM control sequence consists of an on-time, when the chosen motor terminal is connected to the battery terminals and an off-time, where the current in motor terminals is allowed to recirculate through the power switches. As shown in the figure, during the on-time of the PWM control, the output of the current measurement circuit rises, while during the off-time, the output of the current measurement circuit falls due to energy lost in resistance of motor windings and in power switches. The extent of the rise and fall during the PWM operation is a function of inductance of the electric machine. Higher inductance leads to higher resistance to change in current, leading to lower extent of rise and fall, while a lower inductance leads to lower resistance to change in current, leading to higher extent of rise and fall. Moreover, as described hereinbefore, the inductance of the machine is a function of rotor position. Thus, as the electric machine runs, its rotor position and hence the inductance changes periodically. This change in inductance leads to change in extent of current rise and fall. Thus, by observing this extent in rise and fall of current, it is possible to determine when the excitation sequence needs to change. In this regard, FIG. 8 shows a relation between current ripple and time to determine the change in commutation. Change in commutation takes place when ripple current crosses a threshold value.

In an embodiment of the invention, after step 3G or 3H, the CPU determines the speed of the engine. In case it is determined that speed of the engine is more than a threshold value then the method is terminated. However, in case it is determined that speed of the engine is less than a threshold value then current variation in the stator winding is determined to update the excitation of the stator winding.

Advantageously, using the ECU architecture described hereinbefore, it is possible to carry out cranking of an internal combustion engine without any sensor.

While the present invention has been described with respect to certain embodiments, it will be apparent to those skilled in the art that various changes and modification may be made without departing from the scope of the invention as defined in the following claims.

The invention claimed is:

1. A method for cranking an internal combustion engine, the engine coupled to a permanent magnet machine comprising a rotor having a plurality of permanent magnets poles, and a stator having a plurality of phase windings disposed on the stator, each phase winding including a plurality of coils, the method comprising the steps of:
   (a) receiving a start signal;
   (b) determining an initial position of the rotor with respect to a stator phase winding;
   (c) applying a pulse-width-modulated (PWM) signal to the stator winding corresponding to determined initial position of the rotor;
   (d) determining a threshold value of the stator current variation;
   (e) measuring current of the stator winding in response to applied pulse-width-modulated signal to determine current variation;
   (f) if current variation is more than the threshold value: determining updated rotor position, applying a pulse-width-modulated signal to the stator winding corresponding to the updated rotor position; and repeating steps (d)-(f); and
   (g) if current variation is less than the threshold value: applying a pulse-width-modulated signal to the stator winding corresponding to the last updated rotor position and repeating steps (d)-(g),
   wherein the step of determining the threshold value of the stator current variation comprises:
   measuring instantaneous or average battery voltage;
   measuring instantaneous or average engine speed;
   measuring stator current substantially at the beginning of a PWM cycle and substantially at the end of the PWM cycle; and
   determining the threshold value based on the measured battery voltage, engine speed and stator current.

2. The method for controlling an integrated starter-generator as claimed in claim 1, wherein the step of determining an initial position of the rotor with respect to a stator phase winding comprises:
   (a) selecting a pair of stator phase windings;
   (b) applying a voltage signal across the selected pair of stator phase windings for a predetermined period of time;
   (c) measuring the current flowing through the selected windings;
   (d) repeating steps (a)-(c) for a newly selected pair of stator phase windings; and
   (e) determining position of the rotor based on the pair of stator phase windings for which the measured current is maximum.

3. A method for cranking an internal combustion engine, the engine coupled to a permanent magnet machine comprising a rotor having a plurality of permanent magnets poles, and a stator having a plurality of phase windings disposed on the stator, each phase winding including a plurality of coils, the method comprising the steps of:
   (a) receiving a start signal;
   (b) determining an initial position of the rotor with respect to a stator phase winding;
   (c) applying a pulse-width-modulated (PWM) signal to the stator winding corresponding to determined initial position of the rotor;
   (d) determining a threshold value of the stator current variation;
   (e) measuring current of the stator winding in response to applied pulse-width-modulated signal to determine current variation;
   (f) if current variation is more than the threshold value: determining updated rotor position, applying a pulse-width-modulated signal to the stator winding corresponding to the updated rotor position; and repeating steps (d)-(f); and
   (g) if current variation is less than the threshold value: applying a pulse-width-modulated signal to the stator winding corresponding to the last updated rotor position and repeating steps (d)-(g),
   wherein the step of determining an initial position of the rotor with respect to a stator phase winding comprises:
   (a) selecting a pair of stator phase windings;
   (b) applying a voltage signal across the selected pair of stator phase windings for a predetermined period of time;
   (c) measuring the current flowing through the selected windings;
   (d) repeating steps (a)-(c) for a newly selected pair of stator phase windings; and
   (e) determining position of the rotor based on the pair of stator phase windings for which the measured current is maximum.

4. A system for cranking an internal combustion engine, the engine coupled to a permanent magnet machine comprising a rotor having a plurality of permanent magnets poles, and a stator having a plurality of phase windings disposed on the stator, each phase winding including a plurality of coils, the system comprising:
   a control unit coupled to the permanent magnet machine and configured to:
   (a) receive a start signal;
   (b) determine an initial position of the rotor with respect to a stator phase winding;
   (c) apply a pulse-width-modulated (PWM) signal to the stator winding corresponding to determined initial position of the rotor;
   (d) determine a threshold value of the stator current variation;
   (e) measure current of the stator winding in response to applied pulse-width-modulated signal to determine current variation;
   (f) if current variation is more than the threshold value: determine updated rotor position, apply a pulse-widthmodulated signal to the stator winding corresponding to the updated rotor position; and repeat steps (d)-(f); and (g) if current variation is less than the threshold value: apply a pulse-width-modulated signal to the stator winding corresponding to the last updated rotor position and repeat steps (d)-(g); and a power supply connected to the control unit, wherein, to determine the threshold value of the stator current variation, the control unit is further configured to:

measure instantaneous or average battery voltage;

measure instantaneous or average engine speed;

measure stator current substantially at the beginning of a PWM cycle and substantially at the end of the PWM cycle; and determine the threshold value based on the measured battery voltage, engine speed and stator current.

* * * * *